(12) United States Patent
Külper et al.

(10) Patent No.: US 8,815,389 B2
(45) Date of Patent: Aug. 26, 2014

(54) HIGHLY ABRASIONPROOF STRIP FOR ARMOURING CABLE HARNESSES IN MOTORCARS

(75) Inventors: Klaus Külper, Pinneberg (DE); Matthias Von Samson-Himmelstjerna, Henstedt-Ulzburg (DE); Andreas Wahlers, Guderhandvertel (DE)

(73) Assignee: tesa SE, Hamburg (DE)

( * ) Notice: Subject to any disclaimer, the term of this patent is extended or adjusted under 35 U.S.C. 154(b) by 1149 days.

(21) Appl. No.: 10/590,124

(22) PCT Filed: Mar. 4, 2005

(86) PCT No.: PCT/EP2005/002275
§ 371 (c)(1),
(2), (4) Date: Apr. 20, 2007

(87) PCT Pub. No.: WO2005/085379
PCT Pub. Date: Sep. 15, 2005

(65) Prior Publication Data
US 2007/0237936 A1    Oct. 11, 2007

(30) Foreign Application Priority Data
Mar. 4, 2004    (DE) .......................... 10 2004 011 223

(51) Int. Cl.
| | | |
|---|---|---|
| *C09J 7/02* | (2006.01) | |
| *B32B 27/02* | (2006.01) | |
| *B32B 5/24* | (2006.01) | |
| *C09J 7/04* | (2006.01) | |
| *B32B 5/26* | (2006.01) | |
| *B32B 25/20* | (2006.01) | |
| *B32B 7/12* | (2006.01) | |
| *B32B 25/10* | (2006.01) | |
| *B32B 25/14* | (2006.01) | |
| *B32B 25/12* | (2006.01) | |

(52) U.S. Cl.
CPC ............... *C09J 7/0296* (2013.01); *B32B 25/20* (2013.01); *B32B 7/12* (2013.01); *C09J 2203/302* (2013.01); *C09J 2477/006* (2013.01); *B32B 25/10* (2013.01); *C09J 2400/243* (2013.01); *B32B 25/14* (2013.01); *C09J 2400/263* (2013.01); *C09J 2467/006* (2013.01); *B32B 25/12* (2013.01)
USPC ........................... 428/343; 428/220; 428/365

(58) Field of Classification Search
None
See application file for complete search history.

(56) References Cited

U.S. PATENT DOCUMENTS 4,122,223 A    10/1978    Civardi et al.
4,705,715 A *  11/1987    DeCoste et al. .............. 442/151
(Continued)

FOREIGN PATENT DOCUMENTS

DE    43130008    11/1994
DE    295 10 907 U1    10/1995
(Continued)

OTHER PUBLICATIONS

Boettcher, Peter, DE 10107569 (Machine Translation), Sep. 5, 2002.*

*Primary Examiner* — Callie Shosho
*Assistant Examiner* — Cheng Huang
(74) *Attorney, Agent, or Firm* — Norris McLaughlin & Marcus, P.A.

(57) ABSTRACT

The invention relates to a highly abrasionproof and sound-absorbing strip for armoring cable harnesses, especially in motorcars, said strip consisting of a backing comprising a first covering layer A that is joined to a second layer C over the entire surface of the covering layer A in a fixed manner. According to the invention, the covering layer A consists of suede, a non-woven fabric, a woven fabric or a knitted fabric, especially a PET filament fabric or a polyamide fabric, and the layer C consisting of a porous flat structure such as a textile having an open, but stable, three-dimensional structure, a foam or an expanded film.

11 Claims, 3 Drawing Sheets

(56) References Cited

U.S. PATENT DOCUMENTS

| | | | |
|---|---|---|---|
| 5,695,373 A * | 12/1997 | Blackmore et al. | 442/57 |
| 5,804,510 A * | 9/1998 | Spies et al. | 442/141 |
| 6,309,721 B1 * | 10/2001 | Gladfelter et al. | 428/36.1 |
| 7,622,408 B2 | 11/2009 | Zafiroglu | |
| 2003/0198806 A1 | 10/2003 | Samson-Himmelstjerna et al. | |
| 2004/0082243 A1 * | 4/2004 | Kulper | 442/149 |
| 2005/0180704 A1 * | 8/2005 | Terry et al. | 385/100 |
| 2007/0173156 A1 | 7/2007 | Kulper et al. | |
| 2007/0237936 A1 | 10/2007 | Kulper et al. | |

FOREIGN PATENT DOCUMENTS

| | | |
|---|---|---|
| DE | 44 42 092 C1 | 5/1996 |
| DE | 44 42 093 C1 | 5/1996 |
| DE | 44 42 507 A1 | 6/1996 |
| DE | 299 00 294 U1 | 4/1999 |
| DE | 298 23 462 | 7/1999 |
| DE | 198 07 752 A1 | 8/1999 |
| DE | 199 10 730 A1 | 10/1999 |
| DE | 299 16 616 UI | 1/2000 |
| DE | 100 36 805 A1 | 2/2002 |
| DE | 100 11 788 A1 | 3/2002 |
| DE | 100 39 982 A1 | 3/2002 |
| DE | 100 39 983 A1 | 3/2002 |
| DE | 100 42 732 A1 | 3/2002 |
| DE | 101 07 569 A1 | 6/2002 |
| DE | 101 02 927 A1 | 7/2002 |
| DE | 201 21 245 U1 | 7/2002 |
| DE | 101 13 425 A1 | 10/2002 |
| DE | 100 49 975 A1 | 11/2002 |
| EP | 0578151 | 1/1994 |
| EP | 0 716 136 A | 6/1996 |
| EP | 0 716 137 A | 6/1996 |
| EP | 0 886 357 A1 | 12/1998 |
| EP | 0 886 358 A1 | 12/1998 |
| EP | 0 995 782 A1 | 4/2000 |
| EP | 0 995 783 A1 | 4/2000 |
| EP | 1 008 152 A1 | 6/2000 |
| EP | 1 063 747 A1 | 12/2000 |
| EP | 1 136 535 A1 | 9/2001 |
| EP | 1 258 346 A | 11/2002 |
| EP | 1723210 A1 | 11/2006 |
| WO | WO 00/13894 A1 | 3/2000 |
| WO | 2005084944 A2 | 9/2005 |

* cited by examiner

HIGHLY ABRASIONPROOF STRIP FOR ARMOURING CABLE HARNESSES IN MOTORCARS

This application is a 371 of PCT/EP2005/002275, which was filed on Mar. 4, 2005, and claims priority of DE 10 2004 011 223.1, filed on Mar. 4, 2004.

The invention relates to a highly abrasion-resistant tape which can be used in particular for bandaging cable harnesses in automobiles.

In many segments of industry, bundles composed of a multiplicity of electrical lines are wrapped either before installation or when already mounted, in order to reduce the space taken up by the bundle of lines, by means of bandaging, and also to obtain protective functions. With sheet adhesive tapes a certain protection against ingress of liquid is achieved; with airy and bulky adhesive tapes based on thick nonwovens or foam backings, insulating properties are obtained; and when stable, abrasion-resistant backing materials are used a protective function against scuffing and rubbing is achieved.

Particularly the protective function with respect to scuffing, rubbing, grinding on sharp edges and burrs, etc., summarized here under the concept of abrasion resistance, is increasing in significance. The sharp edges, burrs and weld points, etc., that come about as a result of production operations are increasingly not having their sharpness removed by complicated post-production work, since such work entails an additional operation and increased costs. This is so in particular in the case of the untreated bodies in the automobile industry, but also in other segments too, such as in the case of washing machines, vibrating machines such as compressors and the like, for example. Cable strands which run in such segments and which are scuffed by vibration, relative movements and the like on such sharp points are therefore at potential risk of destruction of the protective sheath. This protective sheath may be the additional wound bandaging, or else may be the insulation around the copper cable itself. In that case the result would be a short circuit with complete functional failure and destruction of electrical/electronic components, possibly going as far as a fire, with the attendant risks of damage to equipment and people.

In order to minimize potential hazards of this kind it is the case not only that normal wrapping tapes are used to bandage the cable strands at critical points but also that additional precautions are taken. Either specialty adhesive tapes are used or particular protective components are employed. These components may, for example, be cable ducts made of wear-resistant polymers such as polyamide or fluted tubes or braided hoses of polyester or nylon, all components which are unfavorable from the standpoints of cost, separate logistics and complexity of handling during assembly. In the case of the assembly of fluted tubes and cable ducts, for example, considerable effort is required for attaching the lengthy tube systems and fixing them reliably to the cable bundle and/or to the body, in order to prevent slipping. Additionally, separate measures may be necessary for preventing rattling, since the lines in the tube systems rarely lie flush against them and in the event of vibrations they therefore produce rattling noises with the hard materials of the tubes.

Specialty adhesive tapes as well are used in segments involving increased abrasion protection and scuff protection. Adhesive tapes for the wrapping of cable sets or similar elongated systems with additional functionalities are known in the prior art and in some cases are also utilized commercially:

EP 1 136 535 A1 includes in its description a multilayer adhesive tape with a soundproofing effect, composed of a velour and a nontextile interply, said interply being either a film or a directly applied, nonadhesive plastic or foam coating. This interlayer serves to stabilize the velour against warping and as a barrier layer for preventing penetration of the adhesive, applied by knife coating, into the velour backing. With an adhesive tape of this kind the desired abrasion protection is low and is achieved solely by the outer layer of the velour and the outwardly pointing velour loops.

Sound insulation is the sole purpose of the adhesive tape described in DE 199 10 730 A1, which is composed of a laminate, a sound insulation layer (velour or foam) and a web, produced using hotmelt adhesive, melting powder or a transfer fixative. The use of the very expensive velour backing comprising the polymer material polyester or polyamide is also employed in other applications which describe adhesive tapes with a pronounced antirattle function (DE 299 00 294 U1, DE 299 16 616 U1 and DE 101 02 927 A1). In all cases the resulting adhesive tapes have a high price and in terms of abrasion protection do not meet very high requirements.

A construction similar to that of EP 1 136 535 A1 is possessed by DE 101 49 975 A1. In this case an adhesive tape for protecting articles against abrasion and rattling is described that has a two-layer construction comprising a textile layer and a film applied by calendering. Woven or web, as the textile layer, and PVC films in particular are firmly and permanently connected to one another here, without the use of adhesives, by calendering under pressure and heat. The textile layer is arranged facing away from the article to be protected.

WO 00/13894 A1 describes a scuff protection device as edge protection for sharp-edged components such as sheet steel bodywork burrs, the scuff protection being adhered in such a manner as to engage around such areas. The scuff protection is composed of a textile backing layer (made of velour or a needle felt, for example) and of a protective film, preferably made of thermoplastic polyurethane polymer, which is applied on the side of the scuffing sides, and also of an adhesive layer which is applied on the side of the component and has a release paper lining. Textile backing layer and protective film are joined to one another via a thin adhesive bond, the adhesive being applied only in selected areas in the form of a heat-activable adhesive web, powder or film. This complicated assembly is lined with release paper, used in appropriate cut-to-size shapes, and is therefore unsuitable for the general protective wrapping of cable harnesses. The protective device of this invention does not actively protect the cable harness; instead, where needed, sharp-edged parts are locally masked from their surroundings as a kind of passive cable loom protection.

DE 100 42 732 A1 describes an adhesive tape for the spiral wrapping of elongate products such as cable looms, for example, where a stripe coating which does not extend over the full area of the backing, preferably a textile backing, produces reduced adhesion of the wrapping tape to the lines and hence improved mobility and bendability of the cable loom as a whole. Inventive adhesive tapes of that kind, however, do not offer any particular abrasion protection, but serve solely for the flexibilization of the cable loom.

An adhesive tape with a combination of noise reduction and frictional-stress protection properties is described in DE 101 13 425 A1. Even at the required basis mass of the web backing with vertical pole folds, of more than 200 g/m², the protective effects obtained are only in the middle range for attenuation, and in particular against abrasion, as was already known even from EP 0 995 782 A1 and also EP 0 995 783 A1. Similar comments are also true of DE 100 39 983 A1, which in one specific embodiment describes a textile assembly composed of a scuff-resistant web and a textile sheetlike structure, which is produced without the use of a laminating adhesive or the like, solely by hydroentanglement. While the textile sheetlike structure imparts additional attenuating or reinforcing properties to the assembly, the abrasion resistances for the scuff-resistant hydroentangled base web, composed of stable fibers, is seen as being fairly low for a basis mass of not more than 200 g/m². Further references, and particularly specific details regarding scuff resistances, are absent from all of the protective rights referred to above.

Besides the stitchbonded web mentioned in the cited publication, there are further backings which are used in adhesive tapes for cable harness bandaging. DE 44 42 092 C1 describes one such stitchbond-based adhesive tape, which is coated on the reverse of the backing. DE 44 42 093 C1 is based on the use of a web as backing for an adhesive tape, the web being formed by the formation of loops from the fibers of the web reinforced cross-laid fiber web, in other words a web which is known to the skilled worker under the name Malifleece. DE 44 42 507 C1 discloses an adhesive tape for cable bandaging but bases it on so-called Kunit or Multiknit webs.

Likewise described, in EP 1 063 747 A1, is a multilayer backing assembly, intended for the formation therefrom of a protective wrapping for elongate articles, featuring good abrasion resistance and noise suppression. In accordance with that invention at least two nonwovens should be taken with the assembly backing, these nonwovens being loose, joined to one another, mostly only in subregions, and being able to move relative to one another. Wovens, knits, and similar textile backings are explicitly excluded for unsuitability. Also remaining unclear is the extent of the abrasion resistance and the noise suppression afforded by multilayer systems of that invention, in the absence of any specific, measured data being communicated.

One extremely complicated and high-cost multilayer assembly is disclosed by EP 0 886 357 A1 and EP 0 886 358 A1. In that case a PET spunbonded web, a PET formed-loop knit and, where appropriate, a felt or foam ply are each bonded to a laminating layer. This assembly of up to five layers, which is already complicated, is additionally provided partially with the two necessary components of a touch-and-close fastening system and one or more self-adhesive strips lined by protective paper. From an economic standpoint, systems of this kind with a high abrasion protection function are practicable only at a few selected sites, but not as general wrapping tapes for cable looms or other elongated articles.

With similar complexity, DE 298 23 462 EU1 describes, as protective cladding for preventing rattling noises for line systems, a wrapping tape featuring a backing assembly comprising at least two textile layers, this tape being said additionally to exhibit high abrasion resistance and chafing resistance. The outer layer is composed of a warp knit velour with highly raised velour loops, which in certain areas is connected to a web, preferably a needlefelt web, by means of a heat-activable laminating adhesive, with a coat weight of from 10 to 30 g/m². At about 1.5 to 4 mm, the sheathing is too thick, when applied, for numerous automobile applications and, as a result, cannot be used at narrow points.

In summary it is possible to observe that there are a multiplicity of attempted solutions in which, preferably, the very costly textile backing material, velour, is responsible, in conjunction with at least one further textile or nontextile sheetlike structure, for the particular abrasion protection and/or anti-rattle protection (described in detail in DE 298 23 462 EU1). The backing assembly is produced either without an adhesive layer or else by means of a particular heat-activable laminating adhesive, frequently used only in selected areas. The sole purpose of self-adhesive compositions is to produce an adhesive tape, as a separate layer from this backing assembly. Owing to the use of the knit velour, adhesive tapes of this kind are not only very expensive but also, as a result of the loop structure, are so thick that specialty wrapping tapes of this kind cannot be used in the normal overlapping spiral wrapping or in longitudinal sheathing, owing to the scant installation spaces that are available.

It is an object of the invention to achieve a marked improvement over the state of the art and to provide a tape which combines the possibility for bandaging individual lines to form cable looms with high protection against mechanical damage caused by scuffing and rubbing on sharp edges, burrs, weld spots, etc. This tape, preferably adhesive tape, ought to be suitable not only for the standard wrapping techniques with overlapping or open spiral wrapping around the bundle of lines but also for longitudinal application by means of applicators, such as are described in EP 1 008 152 A1, for example, or in the form of special processing versions, particularly in accordance with DE 100 36 805 A1. In the special form with only striplike adhesive coating in the longitudinal direction at the edges of the backing material, in accordance with DE 100 42 732 A1, the backing material of the invention ought also to lead to innovative, highly abrasion-resistant cable wrapping tapes which combine bandaging function and abrasion protection function in the preferred adhesive tape.

An established method of determining the abrasion resistance of protection systems in vehicle electrics is the international standard ISO 6722, section 9.3 "scrape abrasion test" (issued April 2002). In this test the test specimen (for example, the insulated copper line or else the wrapping tape adhered to a metal mandrel) is exposed to a thin steel wire with defined scrape geometries and under a defined weight load, until the protective sheath has been rubbed through and, as a result of short circuiting, the counter which runs at the same time comes to a stop.

Unless indicated otherwise, all details relating to abrasion resistance refer to this ISO 6722 method. The adhesive tape is for this purpose adhered in a single ply in the longitudinal direction on a metal mandrel 10 mm in diameter; the scraping motion takes place centrally on the adhesive tape under a weight load of 7 N. The rubbing body used is a steel wire complying with ISO 8458-2, 0.45 mm in diameter. The parameter for the abrasion resistance that is reported is the number of scrapes until short circuiting. In cases of very high scuff resistances, the mass that is applied can be increased in order to reduce the measurement time and the number of scrapes. In this case an applied weight of 10 N has proven favorable.

The invention accordingly provides a highly abrasion-resistant and noise-suppressing tape for bandaging cable harnesses, particularly in automobiles, comprising a backing with a first outer layer A, which is firmly connected to a second layer C over the entire area of outer layer A, the outer layer A is composed of a velour, scrim, woven fabric or formed-loop knit, in particular a woven PET filament fabric or a woven polyamide fabric, the layer C being composed of a porous sheetlike structure such as a textile having an open but stable three-dimensional structure, or of a foam or of a foamed film.

In a first advantageous embodiment of the invention the layer C is firmly connected on the open side to a second outer layer B over the entire area of outer layer B, the outer layer B being composed preferably of a scrim, woven fabric or formed-loop knit, in particular of a woven PET filament fabric or a woven polyamide fabric.

Surprisingly it is found that when a multi-ply system is produced in accordance with the invention the abrasion resistance of the overall assembly turns out to be much higher than the sum of the abrasion resistances of the individual plies, thereby achieving a considerable increase in the protective effect against rubbing and scuffing exposures without the need to take special protection measures. With the inventive construction of the tape it is possible to produce a combination of the bandaging possibilities of a normal wrapping tape with the abrasion protection of specialty systems such as TwistTubes®, braided hoses, flexible corrugated tubes and the like. For this purpose it is necessary to select the kind of composite construction for the backing material that is described below, and in this context the stated embodiments should be regarded only as examples.

Preferably the abrasion resistance of the backing (measured in accordance with ISO 6722, section 9.3, "Scrape abrasion resistance") is at least 150% of the sum of the abrasion resistances of the individual plies.

The system in question is a multi-ply system composed of one or two identical or different outer layers A and/or B which per se feature favorable abrasion resistance, such as, for example, films, nonwovens, formed-loop knits, wovens, velour, etc., and which are composed of corresponding materials, and at least one layer C, which firstly provides the permanent stable connection between the outer layers A and optionally B but is also designed such that it is able to absorb and "eliminate" forces and energies which occur in the course of rubbing and scuffing motions. This specific energy elimination may denote the mechanical energy being passed onto other parts in the tape or its surroundings or else may denote its at least partial conversion into heat or the like. This prevents the original mechanical energy destroying the outer layer(s), by being converted into other forms of energy or else transmitted to areas of the tape at which it causes no damage or else lesser damage than directly on the outer layers. Accordingly the functional capacity of the tape as a wrapping tape and protective sheath is prolonged, so that in many cases there is no need for additional, expensive and labor-intensive protection systems.

In the prior art, use is also made in many cases of multi-ply composite systems in which, however, optionally present interlayers do not have the aforementioned functionality. The interlayers are usually typical laminating adhesives for the task of producing a firm connection in multi-ply systems, or are auxiliary plies for the outer layer, for the purpose of giving it, for example, stabilization against distortion during coating, or else of actually enabling coating with liquid, penetrating adhesives, if the outer layer itself is too absorbent or permeable.

Suitable for use as inventive layer C, which significantly increases the abrasion resistance of the composite system, and hence are recognized as being advantageous, are textiles such as, for example, staple fiber nonwovens, spacer knits, loop products, three-dimensional nonwoven structures comprising Kunit, Multiknit or Maliknit or Caliweb® and the like, provided they make it possible to divert the force exerted by the friction or the scuffing on the outer ply, by means of microscopic or macroscopic movements in the interply. An effect of this is that the energy, which is destructive per se, does not act specifically in a local manner on the outer ply and therefore causes greatly reduced damage.

In the case of the textiles that are suitable in accordance with the invention for the interlayer C, the fibers, filaments or yarns are in many cases not laid two-dimensionally flat in the backing material plane, but instead have a pronounced alignment in the third dimension, the layer thickness. This may be achieved, for example, by forming folds of fiber tufts as in the case of the Multiknit or by virtue of filaments or yarns having stable and permanent loops in the thickness direction. The Caliweb® may serve as an example of such a textile. The Caliweb® is composed of a thermally fixed spacer nonwoven Multiknit with two external loop layers and an inner pile layer, which are arranged perpendicularly with respect to the loop layers.

Suitable textile layers C preferably have a basis weight of 100 to 500 $g/m^2$; for a good combination of abrasion resistance and suppression, further, textiles having a basis mass of 150 to 300 $g/m^2$ are preferably employed.

Outer layers A and optionally B and layer C must for this purpose form a stable, potentially load-bearing assembly which, according to the prior art, on the one hand can be achieved through the use of known heat-activable or self-adhesive laminating adhesives or without any use of laminating adhesives at all, by means of skilled mechanical bond formation. Thus, in the case of production of a Multiknit from the Kunit precursor during the interlooping of fiber material from the pile folds, finished textile flat structures such as wovens, nonwovens or formed-loop knits can be supplied and combined to form a mufti-ply layer system.

By means of an appropriate operating regime the finished textile backing, for example a PET woven fabric, is "stitched" into the surface of the Multiknit material, in other words firmly and permanently mechanically bonded into said surface, so that a stable assembly composed of a textile outer layer and the Multiknit is formed as layer C. Besides the stitching technology as in the case of the Multiknit, other web technologies are also capable of producing flat composites of this kind, involving the use for example of needling or hydroentangling technology. The textile outer layer of an assembly of this kind constitutes the point of attack for the rubbing or scuffing load. The textile interlayer takes over part of the energy or else allows the outer layer to divert the frictional load by means of microscopic or macroscopic movements. All in all, backing constructions of this kind achieve improved abrasion and scuffing resistance as compared with the individual components.

In a further embodiment of tapes of the invention it is possible to use foamed plastics as layer C. Permanently elastic foams in particular are appropriate for stabilizing the actual outer layer against abrasive stresses, by absorbing energy or diverting the frictional movement. Whereas normally foams themselves have virtually pronounced abrasion and scuff resistance and are rather used for damping purposes, they are protected in this case, as layer C, from the direct scuffing attack as a result of the outer layers, and their action in this situation is only synergistic.

A characteristic recognized as being particularly advantageous for the layer C, whether in the form of a foam, foamed film or textile backing, is a density of 100 to 600 $g/dm^3$. As a result of such a density the layer C has a sufficient quantity of air-filled cavities, and as a result, given an appropriate choice of the type of intermediate backing, mobility in the microscopic range, and hence the conduction or dissipation of energy, are brought about. Substantially lower densities harbor the risk of inadequate mechanical strength, so that under scuffing loads on the outer layer the layer C would also be irreversibly damaged; conversely, markedly higher densities than 600 $g/dm^3$ reduce the "buffer effect", since the layer C increasingly becomes like a homogeneous layer structure, such as a compact film, for example. In that case the quality of noise suppression in particular is reduced.

Interlayers with a density of 150 to 350 $g/dm^3$ proved particularly suitable.

Without these figures being regarded as a sharp exclusion limit, the layer C ought to have a thickness of 0.2 to 3 mm, with thicknesses of from 0.2 to 1.0 mm being appropriate in view of the upper limit on the total thickness of a tape for bandaging applications of elongated products such as cable strands, for example, which in the normal case is about 1 to 1.5 mm.

Backing assemblies of this kind in accordance with the invention are not only notable for very high abrasion and scuff resistances but also have pronounced or even outstanding soundproofing properties, so that depending on the field of use they can be used not only as a protection system against mechanical loads but also as an antirattle tape. Specifically with cable harnesses in machines or automobiles it is frequently necessary to combine abrasion protection directly with antirattle requirements. A moving cable strand may on the one hand become scuffed on sharp edges and burrs but may also generate rattling noises in the case of vibrations and counterstriking. If the wrapping tapes used for cable bandaging are then capable of actively suppressing or reducing the occurrence of noise, there is no need for additional, high-cost soundproofing measures.

The physical measurement of the noise suppression effect is made in accordance with the method described in detail in DE 100 39 982 A1. This is a measurement methodology which is established in the automobile industry, as specified for example, inter alia, in BMW standard GS 95008-3 (May 2000 edition).

BRIEF DESCRIPTION OF THE DRAWINGS

The invention will now be described in greater detail with reference to the drawings, wherein.

Figure 1:
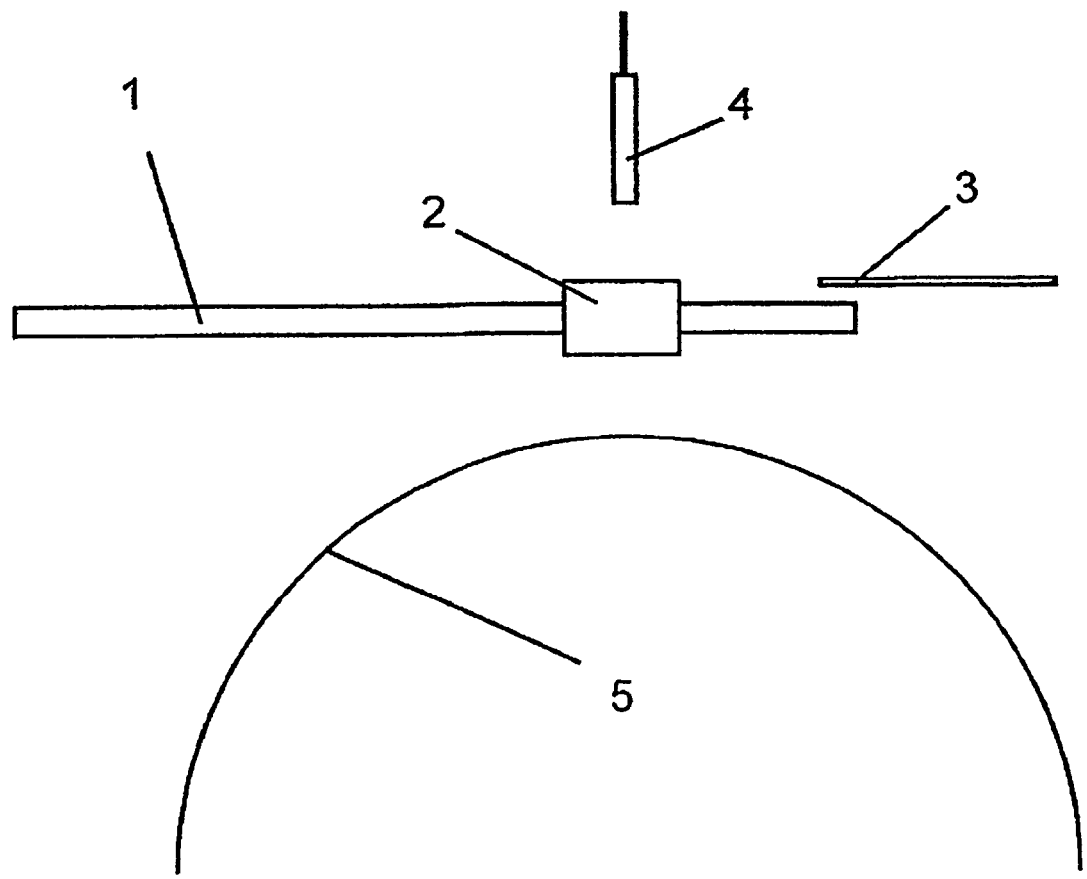
FIG. 1 is a side elevation of the measuring apparatus.
Figure 2:
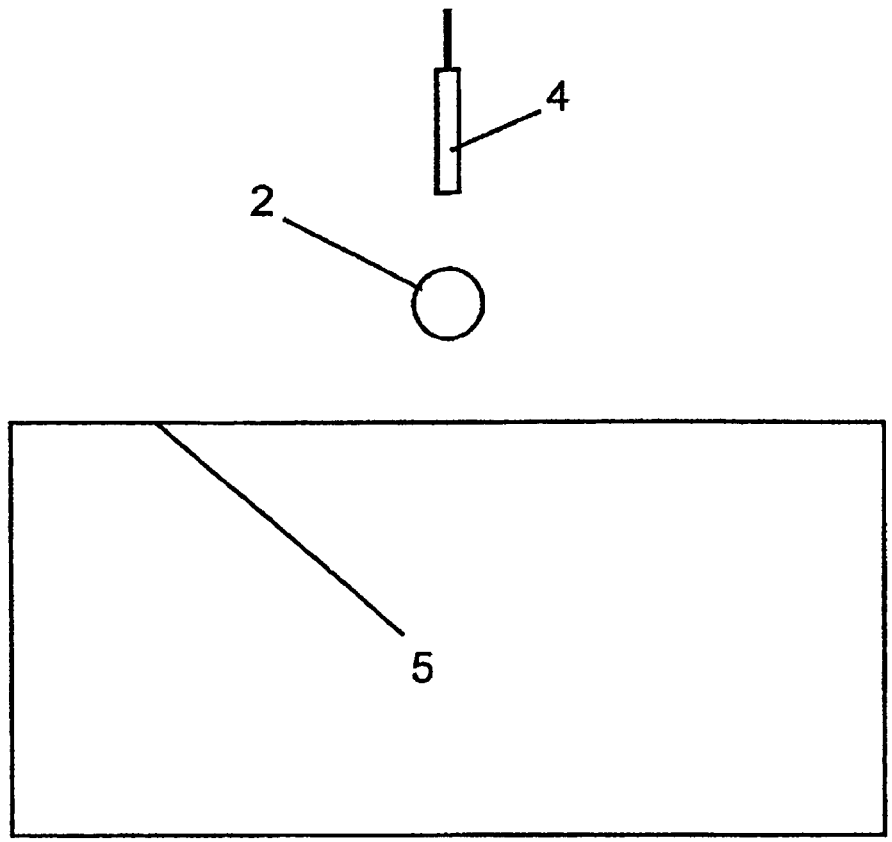
FIG. 2 is a horizontal elevation of the measuring apparatus shown in FIG. 1.

Detailed below in conjunction with FIGS. 1 and 2 is the measurement method in accordance with BMW standard GS 95008-3 from May 2000.

FIG. 1 shows the construction of the measuring apparatus in side elevation, and

FIG. 2 shows the same construction in horizontal elevation.

With this measurement method a defined steel rod 1 with a diameter of 8 mm is wrapped with the test specimen 2—or tape—in such a way as to produce lever lengths of 220 mm and 150 mm. The wrapped steel rod 1 is dropped onto an aluminum sheet 5 until the stop 3 is reached, over the drop height, and with a weight of approximately 16 g. The aluminum sheet 5, which in the unformed state measures 350×190× 0.3 [mm], is arranged in the form of a half-barrel beneath the test specimen 2, producing a width of 290 mm. The overall sound outcome is detected and recorded by means of a microphone 4, disposed over the test arrangement, in a frequency range of 20 to 12 500 Hz, for example, using a commercially customary noise meter, of type 2226 from Bruel & Kjaer for example. Particularly relevant for the human ear are frequencies in the range from 2000 to 5000 Hz. The suppression is reported as the difference between blank value with unwrapped steel rod and the respective measurement in dB(A).

Where multi-ply backing assemblies of the prior art already have a certain sound damping and noise suppression effect, that effect can be considerably enhanced by using backing assemblies comprising, in the layer C, textiles having an open but stable three-dimensional structure. Textiles which have proven particularly suitable in this context are those already listed, such as staple fiber nonwovens, spacer knits, loop products, and three-dimensional nonwoven structures of Kunit, Multiknit, or Maliknit or Caliweb®. Moreover, in accordance with the invention, foamed films or foams, by virtue of their porous cavity structure, also produce a high level of active antirattle protection.

Backings of the invention feature noise suppressions in accordance with the method specified above of at least 10 dB(A), in particular of at least 15 dB(A).

The full-area connection of the outer layers A and optionally B to the layer C can take place through the use of a laminating adhesive in a low layer thickness and also by "intermeshing", such as, for example, by overstitching or needling. Stitching together, given an appropriate combination of outer plies and intermediate plies, may itself be part of the backing production operation, so that expensive additional operating steps can be omitted. If the intermediate ply chosen is a Kunit web which by virtue of its pile folds already has the inventive properties of the intermediate ply, then it is possible in the Multiknit machine, by supplying the outer ply A, by suitable interlooping with the Kunit web, to achieve a sufficient composite strength of outer ply and intermediate ply.

Materials used for layers A, B, and C are, in particular, wear-resistant polymers such as polyesters, polyolefins, polyamides or glass fibers or carbon fibers.

In a further advantageous embodiment of the invention the backing is coated on at least one side with a self-adhesive compound. Coating in that case takes place onto the side of the layer C facing away from the outer layer A, and/or onto the open side of outer layer B.

It is evident to the skilled worker in this context that in a specific case it is necessary to harmonize intermediate layer, adhesive, and coating technology with one another in order, for example, to prevent the strikeaway of a fluid adhesive and the "impregnation" of the backing assembly.

Figure 3:
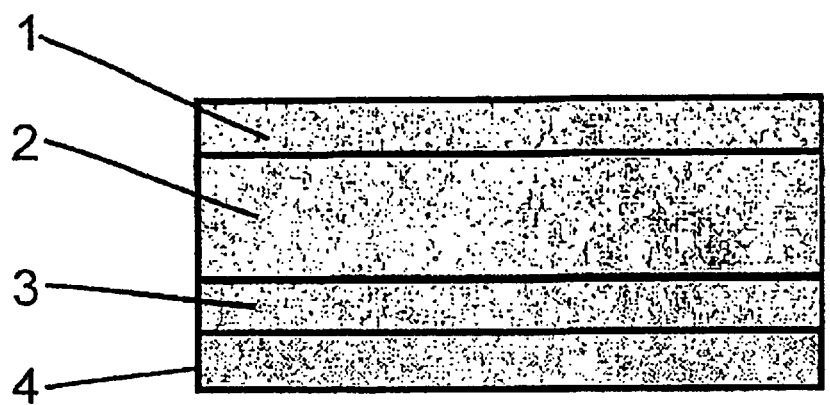
FIG. 3 is a depiction of the structure of one embodiment of an adhesive tape according to the invention.

FIG. 3 depicts an adhesive tape of the invention. Located between the outer layers A (1) and B (3) is the interlayer C (2). Applied to the outer layer B (3) is a self-adhesive layer (4).

In order to produce a self-adhesive tape from the backing it is possible to have recourse to any of the known adhesive systems. Besides natural rubber or synthetic rubber based adhesives it is also possible to use silicone adhesives and, in particular, polyacrylate adhesives. On account of their particular suitability as the adhesive for wrapping tapes for automobile cable sets, with respect to the absence of fogging and also the outstanding compatibility with PVC and PVC-free core insulation, preference is given to solvent-free acrylate hotmelts, as described in more detail in DE 198 07 752 A1 and also in DE 100 11 788 A1. The adhesive coat weights should be adapted to the respective assembly systems in respect of the roughness and absorbency of the surface to be coated, and are in the range between 40 to 100 g/m$^2$ for smooth, nonabsorbent outer layers or else up to 300 g/m$^2$ for open, textured outer layers, with 50 to 150 g/m$^2$ being regarded as sufficient in the normal case. As coating technology for backing materials of this kind known systems come into play, with appropriate processes for open, absorbent textiles being those which allow adhesives of high viscosity to be applied without pressure, such as the nozzle coating of hotmelt adhesives or their application by transfer from an antiadhesive carrier cloth or release liner to the backing assembly.

A self-adhesive treatment can also be achieved by providing the backing assembly not with a self-adhesive coating but instead with a double-sided adhesive tape. Depending on the nature of the adhesive and also on the customer's desired processing, the silicone release paper on the outer adhesive of the adhesive tape can be removed at lamination, or remains intact until the end application, as a protection for the self-adhesive layer against contaminants, etc.

Owing to the outstanding configuration of the tape of the invention, particularly if it has been made adhesive on one side, it can be used for wrapping elongate product, such as cable looms in particular, the tape being guided in a helical spiral around the elongate product. Alternatively the elongate product is sheathed by the tape in its axial direction.

Adhesive tapes of the invention can be employed for the spiral open or overlapping winding of elongate products such as cable looms—for that purpose the coating of adhesive is performed on one side over the full area or in the form of stripes in accordance with DE 100 42 732 A1. The backing assembly can also be used to produce constructions for the lengthwise wrapping of elongate products, as already described by DE 100 36 805 A1, for example. For that purpose, two similar or different adhesive tapes comprising backing assembly and adhesive are laminated together in offset form, with the adhesive sides facing one another.

In another embodiment, two adhesive tapes are laminated together on the adhesive side and in a centered form, but the original widths of the adhesive tapes are different, so that in this case too, the end product obtained is an adhesive tape having stripes of adhesive on both edges and a nonadhesive middle region; in contrast to the drawing, however, the stripes of adhesive in the last-described case are oriented toward the same side.

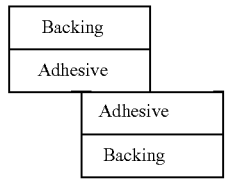 [SMILES: C1CC2C1CC1C3CCC3CC21]

Through an appropriate selection of the two components, in other words, in this case, the two self-adhesive tapes, the adhesive tape can be varied within wide ranges for longitudinal sheathing applications. By way of the type of backing composites used it is possible to select the abrasion resistance and thermal stability, damping properties and also color and appearance of the outer ply.

In addition, therefore, the concept of the invention also embraces an elongate product, such as a cable harness in particular, wrapped with an adhesive tape of the invention, and also a vehicle comprising the wrapped elongate product.

As outer layers A and optionally B for the backing suitability is possessed in principle by all sheetlike structures which offer a suitable scuff resistance and surface area as to be appropriate for applications of this kind in the automobile segment, especially woven fabrics, formed-loop knitted fabrics, velours, nonwovens and similar textile materials. Fabrics which have proven particularly suitable are closely woven filament fabrics of polyester or nylon with a weave construction of 40 to 50 threads per cm in the warp direction and 20 to 30 threads per cm in the fill direction. Woven PET fabrics of this kind with a basis weight of from 60 to 150 g/m2 have already been used for some time in wrapping tapes in the engine compartment and are known to have a mean abrasion resistance of approximately 1000 scrape cycles in accordance with ISO 6722 (mandrel diameter 10 mm, 10 N applied weight, 0.45 mm steel wire) (see table 1):

TABLE 1

| Adhesive tape | Abrasion resistance |
|---|---|
| Woven PET fabric (130 g/m$^2$) with rubber compound | 500 to 1000 cycles |
| Stitchbonded PET web (80 g/m$^2$) with rubber compound | 20 to 100 cycles |
| 0.1 μm PVC film with rubber compound | 1 to 50 cycles |
| TwistTube = braided PET hose (without adhesive) | 2000 to 5000 cycles |

It can be assumed in a first approximation that when a backing composed of two or more plies of textiles is used, the abrasion resistances of the individual components add to one another (see table 2).

TABLE 2

| Construction of the backing assembly from 2 woven PET filament fabrics (125 g/m$^2$) and as interlayer C | | Abrasion resistance (7 N applied weight) |
|---|---|---|
| Version 1 | none | 5130 cycles |
| Version 2 | 30 g/m$^2$ laminating adhesive | 5310 cycles |

For the measurement of version 1, two plies of the above-described woven PET filament fabric are fixed mechanically on the abrasion measurement apparatus and measured without an additional laminating adhesive. The use of the laminating adhesive in the case of version 2 produces no significant increase in abrasion resistance as compared with the adhesive-free base version 1.

The absolute gain in abrasion resistance turns out surprisingly to be synergistic and hence greater than purely additive when a textile intermediate backing of the invention is additionally incorporated between the two outer plies.

TABLE 3

| Adhesive tape | Thickness | Abrasion resistance (7 N applied weight) | Noise suppression |
|---|---|---|---|
| PET Kunit, 300 g/m$^2$ | 1.3 mm | 1500 cycles | 15.5 dB (A) |
| PET Kunit, 290 g/m$^2$ Assembly with 80 g Maliwatt | 1.6 mm | 4700 cycles | 27 dB (A) |

Whereas in the first measurement in table 3 only the "interlayer" C, a 300 g Kunit, was tested, for the second measurement an assembly was available that was produced by interlooping the Kunit intermediate backing on a Multiknit machine with an 80 g PET Maliwatt as base material. Since the outer layer A, an 80 g PET Maliwatt, has on its own an abrasion resistance of only 300 cycles, it is clearly evident that a superadditive improvement in abrasion protection is achieved through this kind of assembly formation.

From the exemplary backing assemblies of tables 2 and 3 it is clear that, with a corresponding construction of the backing material in accordance with the invention, very high abrasion and scuff resistances are achievable, so that adhesive tapes produced from such backings offer an attractive combination of bandaging and wrapping tape with integrated abrasion and rattle protection. Adhesive tapes of this kind are appropriate primarily for the spiral and longitudinal sheathing of electrical lines to form cable sets when the latter are used on a long-term basis in areas where scuffing and vibration are hazards. In view of their excellent abrasion protection effect and soundproofing, however, backing assemblies of this kind possess general suitability as protective systems against striking, scuffing and rubbing stresses. The provision of adhesion, to form an adhesive tape, is not absolutely necessary if the positioning of the system at the area to be protected is achieved in another way: for example, in the form of a stitched hose or a hose with touch-and-close fastening around an elongate product requiring protection.

The examples described below indicate to the skilled worker how such assembly backings are to produced.

EXAMPLE 1

A Kunit nonwoven made from PET staple fibers and weighing 250 g/m² is processed to a Multiknit, and in the course of this processing the nonwoven is supplied within an open woven nylon fabric of 60 to 70 g/m², which can be reliably punched through by the needles during the interlooping operation and in that way is firmly bonded mechanically to the Multiknit interlayer in the form of an outer layer. The assembly backing has a thickness of 1 mm. The woven nylon fabric represents the wear-resistant outer layer, the PET Multiknit the abrasion-protection-promoting interlayer. The backing assembly has an abrasion resistance in accordance with ISO 6722 of well above 20 000 cycles under a weight load of 7 N.

Coated on the side of the backing assembly remote from the woven nylon fabric are 140 g/m² of a black, resin-modified natural rubber adhesive such as is known for use in cable wrapping tapes, such as Tesa® 51606, for example. In the course of the coating operation care should be taken to ensure, by means of a sufficiently high viscosity of the dissolved rubber adhesive, the application method, and rapid drying, to ensure that only small amounts of the adhesive can strike through into the inherently absorbent Multiknit interply.

On the basis of its high abrasion and scuff resistance the adhesive tape is suitable for use as wrapping tape for cable strands in areas at risk. The Multiknit interply gives the adhesive tape additional excellent antirattle properties, According to the soundproofing measurement as per BMW standard GS 95008-3 (section 11) of May 2000, attenuation values of 15 dB (A) or more are obtained.

EXAMPLE 2

A Maliwatt web weighing 310 g/m² (PET staple fibers, thickness 0.75 mm, linear density 28, type "cross stitched-bonded fabric") from Tietex Asia Ltd. and a woven fabric of 100 g/m² (weft: 30 mesh, warp: 45 mesh) are subjected to crosswise overstitching (thread weight 40 g/m²), so that the needles penetrate the woven and the web and mechanically connect them firmly. The overall backing assembly has a total thickness after overstitching of 0.9 mm.

Following lamination of 60 g/m² of a UV-crosslinked acrylate hotmelt adhesive, of the kind used as standard for cable loom applications, abrasion resistances in accordance with ISO 6722, with a weight load of 10 N, of more than 8000 double cycles are measured.

On account of its very high abrasion resistance, the adhesive tape with a backing construction of this kind is suitable as a protective tape for cable strands in jeopardized areas. With a noise suppression effect of 11 dB (A), the tape additionally meets antirattle requirements for passenger compartment applications.

What is claimed is:

1. An abrasion-resistant and noise-suppressing tape for bandaging cable harnesses, the tape comprising a backing with a first outer layer A having a first side, wherein the first side of the first outer layer A is connected to a separate layer C over an entire area of the first side of the first outer layer A, wherein the separate layer C is connected on an open side to a second outer layer B over an entire area of a first side of the second outer layer B, wherein mechanical bond formation connects, without adhesive, the first outer layer A and the separate layer C and connects, without adhesive, the second outer layer B and the separate layer C to form the backing, wherein the first outer layer A is composed of a velour, scrim, woven fabric or formed-loop knit,
the second outer layer B is composed of a velour, scrim, woven fabric or formed-loop knit,
the separate layer C is composed of a textile having an open but stable three-dimensional structure, and
the separate layer C is a spacer knit, a loop product, a three-dimensional nonwoven structure or a warp knit and the separate layer C has a basis weight of 100 to 500 g/m² and a density of 100 to 600 g/dm³.

2. The abrasion-resistant and noise-suppressing tape according to claim 1, which exhibits an abrasion resistance of the backing (measured in accordance with ISO 6722, section 9.3, "Scrape abrasion resistance") of at least 150% of the sum of the abrasion resistances of the individual first outer layer A, the second outer layer B and the separate layer C.

3. The abrasion-resistant and noise-suppressing tape according to claim 1, wherein the separate layer C has a thickness of 0.2 to 3 mm.

4. The abrasion-resistant and noise-suppressing tape according to claim 1, wherein the first outer layer A, the second outer layer B, and the separate layer C comprise wear-resistant polymers.

5. The abrasion-resistant and noise-suppressing tape according to claim 1, wherein a second side of the second outer layer B is coated with a self-adhesive layer, wherein the second side of the second outer layer B is located opposite to the first side of the second outer layer B and the separate layer C.

6. The abrasion-resistant and noise-suppressing tape according to claim 1, wherein the mechanical bond formation comprises an interlooping, a stitching, a needling, a hydroentangling, an overstitching or an intermeshing.

7. The abrasion-resistant and noise-suppressing tape according to claim 1, wherein the mechanical bond formation comprises the separate layer C intermeshed with the first outer layer A and the separate layer C intermeshed with the second outer layer B.

8. A method of wrapping an elongate product comprising guiding the abrasion-resistant and noise-suppressing tape according to claim 1 in a helical spiral around the elongate product.

9. A method of wrapping an elongate product comprising sheathing the elongate product with the abrasion-resistant and noise-suppressing tape according to claim 1 in its axial direction.

10. An elongate product wrapped with the abrasion-resistant and noise-suppressing tape according to claim 1.

11. A vehicle comprising the elongate product according to claim 10.

* * * * *